July 12, 1932.  E. D. TILLYER  1,866,734
OPHTHALMIC LENS
Filed March 8, 1928
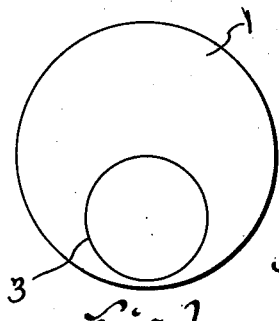
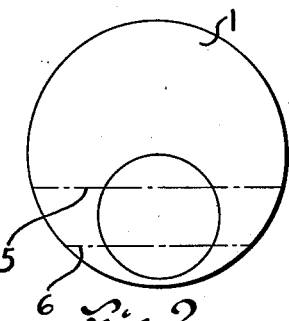
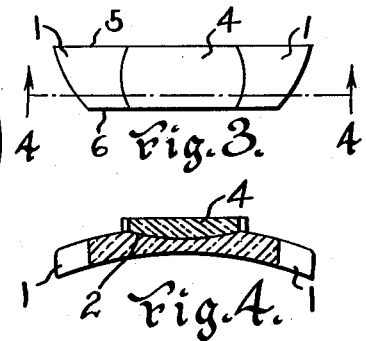
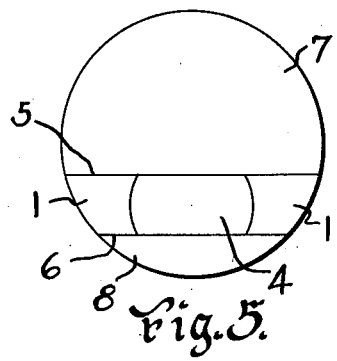
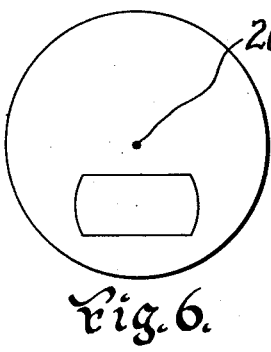
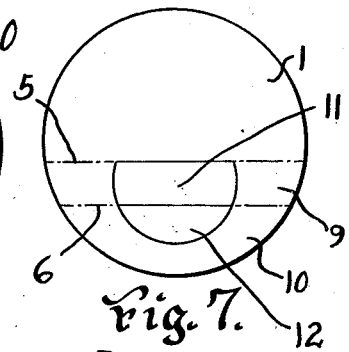
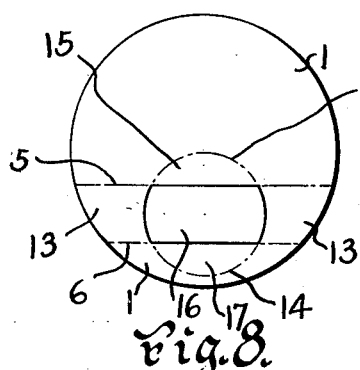
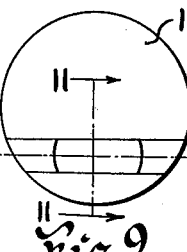
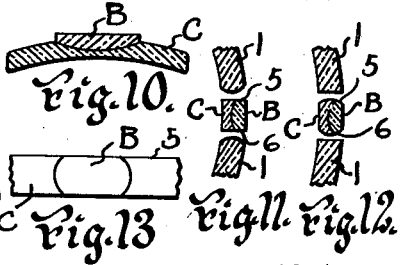
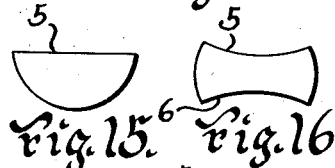
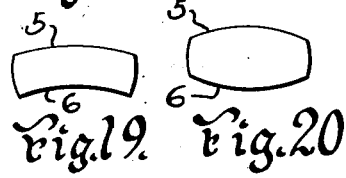
Inventor
Edgar D. Tillyer.
By Harry H. Styll
Attorney Patented July 12, 1932

1,866,734

UNITED STATES PATENT OFFICE

EDGAR D. TILLYER, OF SOUTHBRIDGE, MASSACHUSETTS, ASSIGNOR TO AMERICAN OPTICAL COMPANY, OF SOUTHBRIDGE, MASSACHUSETTS, A VOLUNTARY ASSOCIATION OF MASSACHUSETTS

OPHTHALMIC LENS

Application filed March 8, 1928. Serial No. 260,037.

This invention relates to improvements in ophthalmic lenses and has particular reference to an improved multifocal lens, an improved blank therefor and an improved process for making the same.

The principal object of the invention is to provide an improved process for making a fused multifocal ophthalmic lens having shapes of segment not easily producible or not producible at all by grinding and abrading processes.

Another object of the invention is to provide an improved blank for a fused multifocal ophthalmic lens having the reading segment restricted in height.

Another object of the invention is to provide improved means for making a fused multifocal lens having the reading segment shaped and positioned as desired.

Another object of the invention is to provide an improved multifocal lens in which the prismatic displacement between the fields is reduced.

Another object of the invention is to provide an improved fused multifocal lens having a reading portion that is relatively narrow in height and relatively long in width.

Another object of the invention is to provide simple, economical and efficient means for regulating and controlling the shape and location of the reading portion of a fused multifocal lens.

Another object of the invention is to provide improved processes for making a multifocal lens and blank for the same having those characteristics.

Another object of the invention is to provide improved means for reducing color aberrations and fusing difficulties in the production of these lenses.

Other objects and advantages of the invention will become apparent from the following description taken in connection with the accompanying drawing, and it will be apparent that many changes may be made in the arrangement of parts, details of construction and the steps of the process without departing from the spirit of the invention as expressed in the accompanying claims. I, therefore, do not wish to be limited to the exact matters shown and described as the preferred forms only have been shown by way of illustration.

Referring to the accompanying drawing:

Fig. 1 is a front or face view of a fused multifocal lens blank having the reading portion fused into the distance portion;

Fig. 2 is a view similar to Fig. 1 showing the lines indicated by dots and dashes on which the reading segment is cut from the distance field;

Fig. 3 is a front or face view of the reading segment after it has been cut from the blank of Fig. 2;

Fig. 4 is a cross section on line 4—4 of Fig. 3;

Fig. 5 is a front or face view of the distance and reading portions of a blank assembled for fusing;

Fig. 6 is a front or face view of the blank after it has been fused;

Fig. 7 is a finished blank of a modification showing a reading portion and a third field fused to the distance field;

Fig. 8 is a view similar to Fig. 6 with the lines of fusion indicated by dots and dashes thereon;

Fig. 9 is a view similar to Fig. 5 showing the parts assembled for fusing and to illustrate the elimination of color aberrations;

Fig. 10 is a cross section on line 10—10 of Fig. 9;

Fig. 11 is a partial cross section on line 11—11 of Fig 9 showing one form of fusion assembly;

Fig. 12 is a partial cross section on line 11—11 of Fig. 9 showing another form of fusion assembly;

Fig. 13 is a top or face view of a reading segment;

Fig. 14 is a perspective view of the reading segment showing the parts in separated relationship;

Figs. 15, 16, 17, 18, 19, 20 and 21 are front or face views of some of the different shaped segments that may be made with this invention.

In the manufacture of fused multifocal ophthalmic lenses, particularly in the manufacture of fused bifocal ophthalmic lenses which have been sold in such large quantities on the market, it has been found practically impossible to make a reading portion or segment with contour lines other than those obtainable through the use of abrading tools, or in other words, those which are spheric sections. The reading segment, therefore, was usually either a full circle or some portion of a circle in outline. It is a well known optical rule in multifocal and bifocal lenses that the prism displacement of the reading or secondary fields is a function of the width of the reading or secondary fields and of the power of the addition that is to be added to the distance field to produce the reading or secondary magnification. In other words, if the width of the reading field is ten millimeters and the addition to be added is two diopters the displacement is twenty, whereas if the secondary segment was twenty-two millimeters in width as is usual in the round segment fused bifocal and the addition was two diopters the prism displacement would be forty-four, or over twice as much as with the narrower segment. It is, therefore, of first importance in the design of these lenses that the height of the reading or secondary segment be made as narrow as possible compatible with the use of the segment for reading or other use, but on the other hand that the width be as long as compatible with obtaining a wide field of vision. In other words, the most usable reading or secondary segment would be one, the height of which was short and the length or width of which was relatively long.

It is, therefore, the prime object of this invention to produce an improved multifocal fused lens and a blank therefor having a reading or secondary segment of these characteristics, together with improved processes for the production of the same.

Referring to the drawing, wherein similar reference characters denote corresponding parts throughout, I produce my improved lens and carry out my improved process as follows: Into a blank 1 of optical glass preferably adaptable for distance vision, and preferably crown glass, I grind the usual countersink 2 shown in Fig. 4, which countersink has preferably a spherical or other lenticular under body and is circular in contour, the contour of which is indicated by 3 in Fig. 1, and the under body is indicated by 2 in Fig. 4. Into this countersink I fuse in the usual way a segment or button 4, the cross section of which is indicated in Fig. 4 and the outline of which is indicated by 3 in Fig. 1. This button is preferably of flint glass having a different index of refraction from the distance portion 1 of crown glass. This procedure produces the usual blank for the prior art fused bifocal lens.

Having completed the blank shown in Figs. 1 and 4, I next cut or separate the blank on the lines 5 and 6 of Fig. 2, producing a cut out segment shaped as shown in Fig. 3, having the cross section shown in Fig. 4. An examination of Figs. 3 and 4 will show that the cut out segment has two separated portions composed of crown glass 1 with an inner portion 4 composed of flint glass, and that the crown glass 1 extends underneath the portion 4 superimposed thereon. Having cut out the segment on the lines 5 and 6 as described above, I arrange the parts as indicated in Fig. 5, namely a piece of crown glass 7 having one edge engaging the line 5 of the segment and another piece of crown glass 8 of the same index of refraction as the crown glass 7 and of the crown glass 1 having a portion engaging the line 6 of the cut out segment. I then pass them through a furnace and fuse them together so that the glass is fused along the lines 5 and 6, uniting the whole and forming a fused blank as shown in Fig. 6. The pieces of glass 7 and 8 being of the same index of refraction as the portions 1 on each side of the segment 4, the lines 5 and 6 between the portions 7 and 8 and the edge of the blank will disappear on fusing, thus leaving the appearance of the blank as shown in Fig. 6 where the outline of the flint segment will be shown within the field of the crown glass blank.

In Fig. 7 I have indicated a blank for a trifocal lens which can be made following the same process as that described for the bifocal indicated in Fig. 5. In this case I first cut out the segment 9 from one blank and I cut out the segment 10 from another blank and place a piece of crown glass 1 against the cut edge 5, and place the edge of the segment 10 against the cut edge 6, then fuse the three pieces together as before. The cutting lines 5 and 6 indicated by dot and dash lines will disappear in the fusing operation and the finished blank will have the appearance of the blank indicated in full lines in Fig. 7.

It is clear that the central portion 11 of the segment 9, Fig. 7, and the central portion 12 of the segment 10 will be made of different indices of refraction that are different from each other and different from the crown glass 1. In proceeding in this way any relationship between the different relative indices of refraction can be made as desired.

In Fig. 8 I have indicated in dot and dash lines the fusion lines of the blank shown in Fig. 6. As has been stated, the marginal portions of the straight transverse fusion lines 5 and 6 will disappear in the fusing operation. However, if the portion of the glass 13 is not of the same index of refraction as the crown glass 1, that is to say, if there is the slightest variation in the index of refraction, these lines 5 and 6 will be visible, the amount of visibility being dependent upon the variation in the index of refraction of the portion of the glass 13 from the crown glass 1, the wider the difference, the more visible will be the fusion lines. I have indicated by the dot and dash lines 14 the fusing lines of a button made in three pieces, namely 15, 16 and 17, and fused in the countersink 2 of the major blank. If the portions 15 and 17 are identical in refractive index with the crown glass 1 those lines also will disappear in the fusing operation, but if there is a variation from the index of refraction of the crown glass 1 these lines will remain visible.

Now, it is seen that the section 15 lies in the most conspicuous and most usable position in the blank and if the line of fusing of this portion 15 were visible it would cause a defect which would make the lens practically useless. This also applies to the portion 17 below but in a lesser degree. It is equally clear, as indicated in Fig. 8, that the portions 13 are off to the side of the portion 16 and if they are visible are not in such an important location in the lens as the portions 15 and 17; hence the defect here would not be as great as in the case where the portion 15 were visible, so that by following out my process I avoid the possibility of having the segment become visible in that portion of the lens that is most used. The portion 15 is located practically at the optical center of the lens, its position of greatest accuracy and use. This difference represents one of the most important advantages of my invention.

It is well known in the production of fused multifocal lenses that there is apt to be a color disturbance between the distance and the reading fields which is due to a difference in the dispersions of the crown and the flint glasses. It is also well known that one glass will melt at a different fusion point than another, and is is also known that if there is a difference in the refractive index of the two glasses there will be a difference in magnification of the vision, so these elements have to be considered in producing a fused bifocal lens to obtain the desired results.

So far I have described a process for making my improved lens comprising fusing the segment onto the major blank, cutting through the fused segment and fusing the cut out segment along the lines of cutting to a major blank. The lens can be made equally as well by making the segment separately, and then fusing it to the major blank, as for instance as shown in Figs. 13 and 14, I may take a slab of glass C, shape therein the depression 2, and make a button B to fit the depression, and assemble as shown in Fig. 8 with one piece of the major blank 1 engaging the fusing line 5 and the other piece 1 engaging the fusing line 6 and then fuse them together, or if I desire I could first fuse the button B into the recess 2 before fusing on the pieces 1. The last two methods described result in a saving in material and also in the number of fusion operations. It will be understood that the final result is the same regardless of the order in which the steps are carried out.

In fusing together two pieces of glass of different melting points it is clear one will melt before the other. It has been found from experience that in order to avoid air bubbles in the fused blank it is desirable to give the glass that melts first a sharper curvature than that of the glass that melts later, so that the softer glass will fuse and shape itself to the other. My process adapts itself admirably to these requirements in that glass of the required fusing properties may be selected and arranged to suit conditions. For instance, the slab C of the segment, see Figs. 13 and 14, may be of the same index of refraction as the major blank 1 but have a lower melting point, in which case the ends 5 and 6 of the segment, see Fig. 12, are rounded, and the corresponding ends of the major blank 1 are left straight. The major blank 1 may be made of glass having a lower fusing temperature than the slab C, in which case, see Fig. 11, the edges 5 and 6 of the segment are left straight and the corresponding edges of the major blank 1 are rounded. In this way there is a selection of the kind of glass from which the major blank 1, the segment C and the button B are made, whereby provision for good fusion without bubbles can be made, and a relationship between the refractive indices of the glasses brought about.

My process also adapts itself to the elimination of color aberrations between the secondary and major portions of the lens. These color aberrations are due to the difference of dispersion between the various kinds of glass. Ordinary crown glass, of which the major portion is usually made has a low coefficient of dispersion and a low index of refraction; flint glass, of which the secondary portion is usually made, has a high dispersion and a high index of refraction. In making this multifocal a glass for the slab C can be used which has the same refractive index as the major portion 1 but which has a greater dispersion. Also the segment B may be made of a glass such as a dense barium crown, which has the same index of refraction as the usual flint glass but which has a low dispersion so that this combination of B and C has greatly reduced the color aberration over the ordinary crown glass and flint glass combination because the dispersions are closer together. If the dispersions are equal there will be no color due to the addition of the segment alone. It will thus be seen that due to the fact that I have separate pieces 1, B and C, I can make adjustments and selections that not only aid in the fusion, but also aid in decreasing the color aberrations between the secondary and major portions, and also provides adjustment for refractive index which gives me a wide control of fusion, color and magnification to a degree not possessed in any other form of fused multifocal lens. This arrangement gives a wide control of the fusing points, the index of refraction and the dispersion, all of which are of importance in the manufacture of fused multifocal lenses.

It will be clear that I can vary the direction of the cutting lines or edges 5 and 6 of the segment and can thus produce a great number and variation of shaped segments; for instance, the segment shown in Fig. 16 is produced by down curving the line 5 and up-curving the line 6; that shown in Fig. 20 by up-curving the line 5 and down-curving the line 6; that shown in Fig. 17 by down-curving both the lines 5 and 6; that shown in Fig. 18 by making the lines 5 and 6 in the form of inclined straight lines; that shown in Fig. 15 by cutting on the line 5 alone; that shown in Fig. 19 by making both the lines 5 and 6 with an up-curve in contra-distinction of that of Fig. 17. In Fig. 21 I have indicated another form of trifocal, the section 18 being of one index of refraction and the section 19 of another index of refraction. These segments are only some of a various number that may be made. It will be seen that I can produce segments that are of a shape desired and I can produce bifocal, trifocal and other forms of multifocal lenses, and further that I can position these segments as desired with respect to the optical center 20 of a blank as indicated in Fig. 6. It will also be seen that with my process I can make the necessary adjustments of the coefficient of dispersion, fusing point and the refractive indices to make the variations desired to produce the desired requirements of the finished lens.

From the foregoing description it will be seen that I have provided a simple, efficient and economical process for producing a new and improved multifocal lens and a new and improved blank for the same.

Having described my invention, I claim:

1. A multifocal lens comprising a segment of glass having a portion of glass of different index of refraction secured thereto intermediate its ends and a separate piece of glass of the same index of refraction as the segment but of a different melting point secured to a longitudinal edge of the segment and the portion of glass secured thereto.

2. A multifocal lens comprising a segment of glass having a portion of glass of different index of refraction but approximately the same dispersion secured thereto intermediate its ends and a separate piece of glass having the same index of refraction as the segment but a different melting point secured to a longitudinal edge of the segment and the portion of glass attached thereto.

3. The process of making a fused multifocal lens comprising making a relatively long and narrow segment of glass, securing thereto intermediate its ends a piece of glass of different index of refraction, and securing to a longitudinal edge thereof a separate piece of glass of the same index of refraction and a different melting point.

4. The process of making a multifocal lens comprising making a plurality of relatively long and narrow segments of glass, securing to each segment intermediate its ends a shorter piece of glass of different index of refraction from the segment and from each other, and fusing the longitudinal edges of the segments with attached pieces together and a separate piece of glass to the longitudinal edge of one of the segments with its attached portion of glass.

5. A multi-focal lens comprising an upper distance portion of one index of refraction, an intermediate portion the end parts of which are of the same index of refraction as the upper portion and a part between said ends of a different index of refraction, said part having its end edges formed by a line of revolution and its upper and lower edges formed by a line that departs from a line of revolution, and a lower portion of the same index of refraction as the upper portion, the edges of the intermediate portion being united to the lower edge of the upper portion and the upper edge of the lower portion respectively.

6. A multi-focal lens comprising an upper distance portion of one index of refraction, an intermediate portion the end parts of which are of the same index of refraction as the upper portion and a part between the said ends of a different index of refraction, said part having a portion of its contour edge departing from a line of revolution and a portion which is of a line of revolution, and a lower portion of the same index of refraction as the upper portion, the edges of the intermediate portion being united to the lower edge of the upper portion and to the upper edge of the lower portion respectively.

7. The process of making a bifocal or multifocal lens comprising making a segmental circular field on one side of a piece of lens medium, dividing the said piece of medium on two separated lines of division passing through the segmental field and securing separate pieces of lens media edge to edge to the edges of the lines of division of the piece containing the central portion of the segmental field.

8. A bifocal or multifocal lens comprising an upper piece of lens medium having a focal field of one power, an intermediate section having end fields of the same power as the upper portion and a field between the ends of a different power, and a lower piece having a field of the same power as the upper field and the end portions of the intermediate section, the transverse edges of the intermediate section being secured to the lower edge of the upper piece and to the upper edge of the lower piece respectively, all of said fields being on the same side of the composite lens and the edges of union of the upper and lower pieces extending entirely through the composite lens from one surface to the other.

EDGAR D. TILLYER.